US012657295B2

(12) United States Patent
Neuhof et al.

(10) Patent No.: US 12,657,295 B2
(45) Date of Patent: Jun. 16, 2026

(54) DETECTING AND MITIGATING RANSOMWARE ATTACKS

(71) Applicant: Microsoft Technology Licensing, LLC, Redmond, WA (US)

(72) Inventors: Moran Neuhof, Tel Aviv (IL); Jiahao Lu, Singapore (SG); Katie Renae Jones, Wolfeboro, NH (US); Edan Zwick, Tel-Aviv (IL); Bin Zhu, Beijing (CN); Shay Kels, Givatayim (IL); Hang Dong, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 18/393,659

(22) Filed: Dec. 21, 2023

(65) Prior Publication Data

US 2025/0209157 A1 Jun. 26, 2025

(51) Int. Cl.
*G06F 21/55* (2013.01)
*G06F 21/56* (2013.01)

(52) U.S. Cl.
CPC .......... *G06F 21/554* (2013.01); *G06F 21/566* (2013.01)

(58) Field of Classification Search
CPC .............................. G06F 21/554; G06F 21/566
See application file for complete search history.

(56) References Cited

U.S. PATENT DOCUMENTS

| | | | | |
|---|---|---|---|---|
| 2021/0049270 | A1* | 2/2021 | Urmanov | G06F 18/2185 |
| 2021/0273959 | A1* | 9/2021 | Salji | G06N 3/0895 |
| 2022/0342860 | A1 | 10/2022 | Gonzalez Macias | |
| 2023/0231861 | A1* | 7/2023 | Chen | H04L 63/102 |
| | | | | 726/26 |

FOREIGN PATENT DOCUMENTS

CN 114896504 A * 8/2022 .............. G06N 20/00

OTHER PUBLICATIONS

Guillermo Guerrero • Gustavo Betarte • Juan Diego Campo; Process Mining-Based Assessment of Cyber Range Trainings; 2024 L Latin American Computer Conference (CLEI) (2024, pp. 1-10); (Year: 2024).*

(Continued)

*Primary Examiner* — Luu T Pham
*Assistant Examiner* — Chao Wang
(74) *Attorney, Agent, or Firm* — Pillsbury Winthrop Shaw Pittman, LLP

(57) ABSTRACT

In certain embodiments, a time series-based anomaly detection method is provided, which is able to identify anomalous user accounts highly effectively. An activity predictor is used to model normal behaviors of individual accounts and to assess an extent to which a current behavior associated with differs from its past normal behavior. Part of an activity sequence is inputted to the activity predictor, and a resulting activity prediction (the activity predictor's prediction of normal behavior) is compared with the remaining part of the sequence. In preferred embodiments, a multi-stage approach is used, with a more lightweight form of anomaly detection applied in a first stage, and the time-series based detection performed in a second stage only on a subset of activity sequences escalated from the first stage.

20 Claims, 5 Drawing Sheets

(56)　　　　　References Cited

OTHER PUBLICATIONS

Attila Brozik • Ilir Gashi • Kizito Salako; Explaining Black-Box Malware Detectors: A Machine Learning Approach for Behaviour Analysis; 2025 20th European Dependable Computing Conference (EDCC) (2025, pp. 125-131); (Year: 2025).*

Renhao Liu • Frederick Mubang • Lawrence O. Hall; Simulating Temporal User Activity on Social Networks with Sequence to Sequence Neural Models; 2020 IEEE International Conference on Systems, Man, and Cybernetics (SMC) (2020, pp. 1677-1684); (Year: 2020).*

International Search Report and Written Opinion received for PCT Application No. PCT/US2024/055601, Dec. 20, 2024, 16 pages.

"Cyber Security Report", retrieved from https://www.checkpoint.com/security-report/?flz-category=items&flz-item=report--cyber-security-2023, 2023, 109 pages.

"Cyberattacks 2022: Phishing, Ransomware & Data Breach Statistics", Retrieved on https://securityboulevard.com/2023/04/cyberattacks-2022-phishing-ransomware-data-breach-statistics/, Apr. 5, 2023, 11 pages.

"WannaCry ransomware attack", retrieved from https://en.wikipedia.org/wiki/WannaCry_ransomware_attack, 2017, 27 pages.

"What is Human-Operated Ransomware?", retrieved from https://www.checkpoint.com/cyber-hub/threat-prevention/ransomware/human-operated-ransomware/, retrieved on Jun. 4, 2025, 6 pages.

"What is ransomware?", retrieved from https://learn.microsoft.com/en-us/security/ransomware/human-operated- ransomware, Jan. 29, 2025, 8 pages.

Ahmadian, et al., "2entfox: A framework for high survivable ransomwares detection", In 13th international Iranian society of cryptology conference on information security and cryptology (ISCISC), 2016, 7 pages.

Ahmadian, et al., "Connection monitor & connection-breaker: A novel approach for prevention and detection of high survivable ransomwares", In 12th International Iranian society of cryptology conference on information security and cryptology (ISCISC), 2015, pp. 79-84.

Ahmed, et al., "A system call refinement-based enhanced minimum redundancy maximum relevance method for ransomware early detection", In Journal of Network and Computer Applications, vol. 167, Oct. 1, 2020, pp. 102753-102753.

Alhawi, et al., "Leveraging Machine Learning Techniques for Windows Ransomware Network Traffic Detection", In Proceedings of Cyber Threat Intelligence, Apr. 24, 2018, 11 Pages.

Alqahtani, et al., "A survey of crypto ransomware attack detection methodologies: an evolving outlook", In Journal of Sensors, vol. 22, Issue No. 5, 2022 19 pages.

Andronio, et al., "Heldroid: Dissecting and detecting mobile ransomware", In Springer, 2015, pp. 382-404.

Bohra, et al., "An unsupervised multi-detector approach for identifying malicious lateral movement", Inl EEE 36th Symposium on Reliable Distributed Systems (SRDS), 2017, pp. 224-233.

Bowman, et al., "Detecting lateral movement in enterprise computer networks with unsupervised graph AI", In 23rd International Symposium on Research in Attacks, Intrusions and Defenses, 2020, pp. 257-268.

Bursztein, et al., "Handcrafted fraud and extortion: Manual account hijacking in the wild", In Proceedings of the conference on internet measurement conference, 2014_pp.347-358.

Chen, et al., "Automated behavioral analysis of malware: A case study of WannaCry ransomware", In 16th IEEE International Conference on machine learning and applications (ICMLA), 2017, pp. 454-460.

Christna, A., "Proactive measures on account hijacking in cloud computing network", In Asian Journal of Computer Science and Technology, vol. 4, Issue No. 2, 2015, pp. 31-34.

Cohen, et al., "Trusted detection of ransomware in a private cloud using machine learning methods leveraging meta- features from volatile memory", In Expert Systems with Applications, vol. 102, Jul. 15, 2018, pp. 158-178.

Cusack, et al., "Machine learning-based detection of ransomware using SDN", In Proceedings of the 2018 ACM International Workshop on Security in Software Defined Networks & Network Function Virtualization, 2018, 6 pages.

Daku, et al., "Behavioral-based classification and identification of ransomware variants using machine learning", In 17th IEEE international conference on trust, security and privacy in computing and communications, 2018, 7 pages.

Davidson, et al., "Semi-unsupervised Learning for Time Series Classification", In arXiv:2207.03119v3, Jul. 13, 2022, 11 pages.

Dempster, et al., "Maximum likelihood from incomplete data via the EM algorithm", In Journal of the Royal Statistical Society. Series B, vol. 39, Issue No. 1, 1977, pp. 1-38.

Doerfler, et al., "Evaluating login challenges as a defense against account takeover", In The World Wide Web Conference, 2019, 11 pages.

Egele, et al., "Compa: Detecting compromised accounts on social networks", In Network and Distributed System Security (NDSS), vol. 13, 2013, 17 pages.

Fawaz, et al., "Lateral movement detection using distributed data fusion", In 35th Symposium on Reliable Distributed Systems, 2016, pp. 21-30.

Feng, et al., "Poster: A new approach to detecting ransomware with deception", In 38th IEEE symposium on security and privacy, 2017, 2 pages.

Forrest, et al., "A sense of self for UNIX processes", In Proceedings 1996 IEEE symposium on security and privacy, 1996, pp. 120-128.

Gupta, et al., "Security threats in cloud computing", In International Conference on Intelligent Computing and Control Systems, 2019, pp. 1158-1162.

Han, et al., "A Review of Deep Learning Models for Time Series Prediction", In IEEE Sensors Journal, vol. 21, Issue No. 6, 2019, 15 pages.

Hernandez, et al., "R-locker: Thwarting ransomware action through a honeyfile-based approach", Computers & Security, vol. 73, 2018, pp. 389-398.

Hinton, et al., "Stochastic neighbor embedding", In Journal of Advances in neural information processing systems, vol. 15, Dec. 9, 2002, 8 Pages.

Homayoun, et al., "Drthis: Deep ransomware threat hunting and intelligence system at the fog layer", In Future Generation Computer Systems, 2019, pp. 94-104.

Homayoun, et al., "Know abnormal, find evil: frequent pattern mining for ransomware threat hunting and intelligence", In IEEE transactions on emerging topics in computing, vol. 8, Issue No. 2, 2017, pp. 341-351.

Jung, et al., "Ransomware detection method based on context-aware entropy analysis", In Soft Computing, vol. 22, May 30, 2018, pp. 6731-6740.

Kane, et al., "Evolution of ransomware", In IET Network, vol. 7, Issue No. 5, 2018, 7 pages.

Kharaz, et al., "Unveil: a large-scale, automated approach to detecting ransomware", In e Proceedings of the 25th USENIX Security Symposium, 2016, pp. 757-772.

Kharraz, et al., "Cutting the gordian knot: A look under the hood of ransomware attacks", In Springer, 2015, pp. 3-24.

Liu, et al., "Latte: Large-scale lateral movement detection", In Proceedings of IEEE Military Communications Conference, Oct. 29, 2018, 8 Pages.

Ludvigsen, Kasper., "How to make a PyTorch Transformer for time series forecasting", retrieved from https://towardsdatascience.com/how-to-make-a-pytorch-transformer-for-time-series-forecasting-69e073d4061e/, May 12, 2022, 33 pages.

Ma, et al., "Self-Supervised Time Series Clustering with Model-Based Dynamics" In IEEE Transactions on Neural Networks and Learning Systems, vol. 32, Issue No. 9, Sep. 2021, 14 pages.

Maniath, et al., "Deep learning lstm based ransomware detection", In Recent Developments in Control, Automation & Power Engineering, 2017, pp. 442-446.

Manzoor, et al., "Fast Memory-efficient Anomaly Detection in Streaming Heterogeneous Graphs", In Proceedings of the 22nd Acm Sigkdd International Conference on Knowledge Discovery and Data Mining, 2016, 10 pages.

(56)　　　　　References Cited

OTHER PUBLICATIONS

Martin, Erik, "Deepfakes: The Latest Trick of the Tongue", In Speech Technology, Apr. 7, 2022, 05 Pages.

Mbol, et al., "An Efficient Approach to Detect Torrent Locker Ransomware in Computer Systems", Springer, 2016, pp. 532-541.

McIntosh, et al., "Applying staged event-driven access control to combat ransomware", In Computers & Security, vol. 128, 2023, 16 pages.

McIntosh, et al., "Ransomware Mitigation in the Modern Era: A Comprehensive Review, Research Challenges, and Future Directions", ACM Computing Surveys, vol. 54, Issu No. 4, 36 pages.

Milajerdi, et al., "HOLMES: Real-time APT Detection through Correlation of Suspicious Information Flows", In IEEE Symposium on Security and Privacy, 2019, pp. 1137-1152.

Milajerdi, et al., "Poirot: Aligning attack behavior with kernel audit records for cyber threat hunting", In Proceedings of the Acm Sigsac conference on computer and communications security, 2019, pp. 1795-1812.

Moore, Chris, et al., "Detecting Ransomware with Honeypot techniques", In Cybersecurity and Cyber forensics Conference, 2016, pp. 77-81.

Morato, et al., "Ransomware early detection by the analysis of file sharing traffic", In Journal of Network and Computer Applications, 2018, pp. 14-32.

Oz, et al., "A survey on ransomware: Evolution, taxonomy, and defense solutions", In ACM Computing Surveys, vol. 54, Issue No. 22, 2018, 40 pages.

Popoola, et al., "Ransomware: Current trend, challenges, and research directions", In Proceedings of the World Congress on Engineering and Computer Science, vol. 1, 2017, 6 pages.

R, et al., "Evaluating shallow and deep networks for ransomware detection and classification", In international conference on advances in computing, communications and informatics (ICACCI), 2017, 2017, pp. 259-265.

Rhode, et al., "Early-stage malware prediction using recurrent neural networks", In computers & security, vol. 77, 2018, pp. 578-594.

Rimy, et al., "Crypto ransomware early detection model using novel incremental bagging with enhanced semi-random subspace selection", In Future Generation Computer Systems, vol. 101, Dec. 2019, pp. 476-491.

Rimy, et al., "Redundancy coefficient gradual up-weighting-based mutual information feature selection technique for crypto-ransomware early detection", In Future Generation Computer Systems, vol. 115, 2021 pp. 641-658.

Roy, et al., "DeepRan: Attention-based BILSTM and CRF for Ransomware Early Detection and Classification", In Information Systems Frontiers, Jun. 14, 2020, 17 pages.

Scaife, et al., "CryptoLock (and Drop It): Stopping Ransomware Attacks on User Data", In 36th International Conference on Distributed Computing Systems, 2016, pp. 303-312.

Sekar, et al., "A Fast Automaton-Based Method for Detecting Anomalous Program Behaviors", In Proceedings IEEE Symposium on Security and Privacy. S&p. 2001, pp. 144-155.

Sgandurra, et al., "Automated dynamic analysis of ransomware: Benefits, limitations and use for detection", In arXiv:1609.03020v1, Sep. 10, 2016, 12 pages.

Shu, et al., "Unearthing Stealthy Program Attacks Buried in Extremely Long Execution Paths", In Proceedings of the 22nd Acm Sigsac Conference on Computer and Communications Security, 2015, pp. 401-413.

Stroebel, et al., "A systematic literature review on the effectiveness of deepfake detection techniques", In Journal of Cyber Security Technology, vol. 7, Issue No. 2, 2023, pp. 83-113.

Thomas, et al., "Consequences of Connectivity: Characterizing Account Hijacking on Twitter", In Proceedings of the 2014 Acm Sigsac conference on Computer and Communications Security, 2014, 12 pages.

Tian, et al., "Real Time Lateral Movement Detection based on Evidence Reasoning Network for Edge Computing Environment", In IEEE Transactions on Industrial Informatics, vol. 15, Issue No. 7, 2019, 9 pages.

Tseng, et al., "Deep learning for ransomware detection", In the Institute of Electronics, Information and Communication Engineers Technical Report, vol. 116, Issue No. 282, 2016, pp. 87-92.

Ullah, et al., "IDS-INT: Intrusion detection system using transformer-based transfer learning for imbalanced network traffic", In Digital Communications and Networks, vol. 10, 2023, pp. 190-204.

Urooj, et al., "Ransomware Detection Using the Dynamic Analysis and Machine Learning: A Survey and Research Directions", In Applied Sciences, vol. 12, 2022, 45 pages.

Vaswani, et al., "Attention Is All You Need", In Proceedings of 31st Conference on Neural Information Processing Systems, Dec. 4, 2017, 11 Pages.

Wan, et al., "Feature-Selection-Based Ransomware Detection with Machine Learning of Data Analysis", In 3rd International Conference on Computer and Communication Systems, 2018, pp. 85-88.

Wu, et al., "Adversarial Sparse Transformer for Time Series Forecasting", In 34th Conference on Neural Information Processing Systems, 2020, 11 pages.

Wu, et al., "Autoformer: Decomposition transformers with auto-correlation for long-term series forecasting", In Advances in Neural Information Processing Systems, vol. 34, 2021, 12 pages.

Xu, et al., "Anomaly Transformer: Time Series Anomaly Detection with Association Discrepancy", In arXiv:2110.02642v5, Jun. 29, 2022, 20 pages.

Yamany, et al., "A New Scheme for Ransomware Classification and Clustering Using Static Features", In Electronics, Oct. 14, 2022, 26 pages.

Zerveas, et al. "A Transformer-based Framework for Multivariate Time Series Representation Learning", In Proceedings of the 27th ACM SIGKDD Conference on Knowledge Discovery & Data Mining, Aug. 14, 2021, pp. 2114-2124.

Zhang, et al., "Ransomware classification using patch-based CNN and self-attention network on embedded N-grams of opcodes", In Future Generation Computer Systems, vol. 110, Sep. 2020, pp. 708-720.

Zhang, et al., "Classification of ransomware families with machine learning based on n-gram of opcodes", In Future Generation Computer Systems, vol. 90, 2019, pp. 211-221.

Zhou, et al., "Informer: Beyond efficient transformer for long sequence time-series forecasting", In Proceedings of the AAAI Conference on Artificial Intelligence, vol. 35, Issue No. 12, 2021, pp. 11106-11115.

* cited by examiner

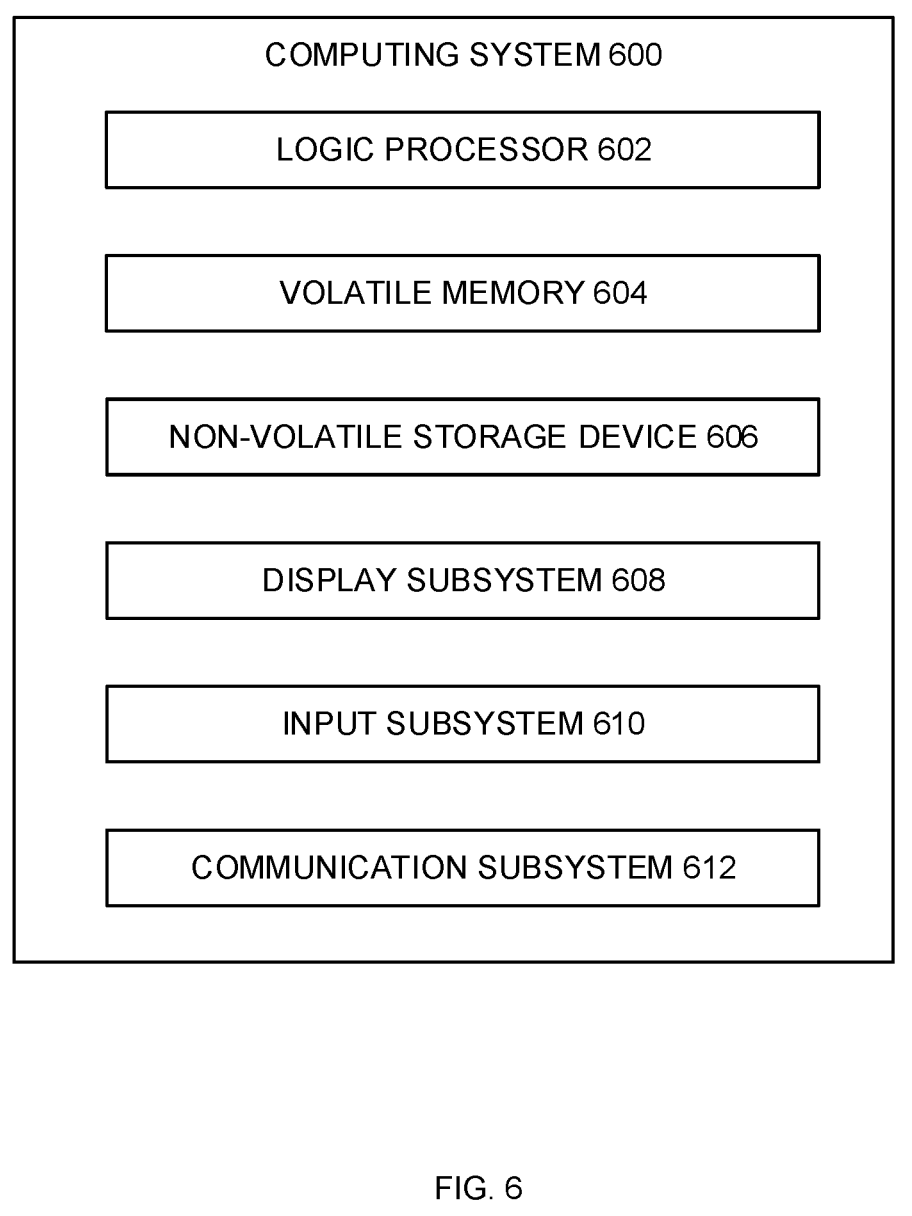

COMPUTING SYSTEM 600

LOGIC PROCESSOR 602

VOLATILE MEMORY 604

NON-VOLATILE STORAGE DEVICE 606

DISPLAY SUBSYSTEM 608

INPUT SUBSYSTEM 610

COMMUNICATION SUBSYSTEM 612

FIG. 6

DETECTING AND MITIGATING RANSOMWARE ATTACKS

TECHNICAL FIELD

The present disclosure pertains to cybersecurity, and in particular to tools and methods for detecting and mitigating ransomware attacks.

BACKGROUND

Ransomware attacks involve malicious software intended to disrupt operation of systems or devices, such as by encrypting data or locking systems or devices, rendering such data, systems or devices inaccessible. An attacker might demand a ransom payment in exchange for restoring access to the data or system. Ransomware attacks are one of the most common cyberattacks businesses witnessed in recent years and this trend is expected to continue.

Ransomware attacks can be broadly categorized into commodity ransomware and human-operated ransomware (HumOR). The former is usually fully automated and involves malicious software designed to spread autonomously through methods such as email phishing and malware delivery, indiscriminately infecting systems and encrypting files. The latter involves deliberate cyberattacks by human attacker(s) who typically target an organization's computer infrastructure, whether onsite or cloud-based. An attacker will often seek to infiltrate a network, elevate their privileges, and deploy ransomware to critical data, exploiting their knowledge of systems and vulnerabilities. To deploy a ransomware payload to resources with high business impact, HumOR typically involves moving "laterally" and escalating privileges in compromised accounts within an enterprise network. Attackers may attempt to infiltrate an enterprise network and find high-value targets by stealing credentials of valid users. Credential theft can occur through phishing or, once the attackers are already in the network, by "dumping" credentials of network's users (obtaining user credentials from an operating system or software). Using stolen credentials, attackers can move stealthily within the network, often stealing additional credentials on the way to escalate privileges (so-called "lateral movement"). A lateral movement process continues until the attackers gain access to valuable enterprise assets. They then deploy their ransomware code to numerous endpoints, often reaching hundreds or even thousands, to launch highly-damaging ransomware attacks.

HumOR poses a particular threat to enterprises due to its targeted nature, typically focusing on organizations rather than individual devices. The involvement of human attackers actively seeking to inflict maximum damage on an organization's data and computer infrastructure further exacerbates the threat. Human attackers often leverage built-in system utilities, commonly used administration tools, and malicious and legitimate software to carry out their nefarious activities while hiding their presence. This makes it considerably more challenging for security professionals to detect and mitigate their presence.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

In certain embodiments, a time series-based anomaly detection method is provided, which is able to identify anomalous user accounts highly effectively. An activity predictor (which may for example take the form of a time-series based deep neural network, such as a transformer) is used to model normal behaviors of individual accounts and to assess an extent to which a current behavior associated with differs from its past normal behavior. Part of an activity sequence is inputted to the activity predictor, and a resulting activity prediction (the activity predictor of normal behavior in a time period corresponding to the remaining part of the sequence) is compared with the remaining part of the sequence that has actually been observed. In preferred embodiments, a multi-stage approach is used, with a more lightweight form of anomaly detection applied in a first stage, and the time-series based detection performed in a second stage only on a subset of activity sequences escalated from the first stage.

BRIEF DESCRIPTION OF FIGURES

Particular embodiments will now be described, by way of example only, with reference to the following schematic figures, in which:

FIG. 6 shows a schematic block diagram of a computer system . . .

DETAILED DESCRIPTION

Figure 1:
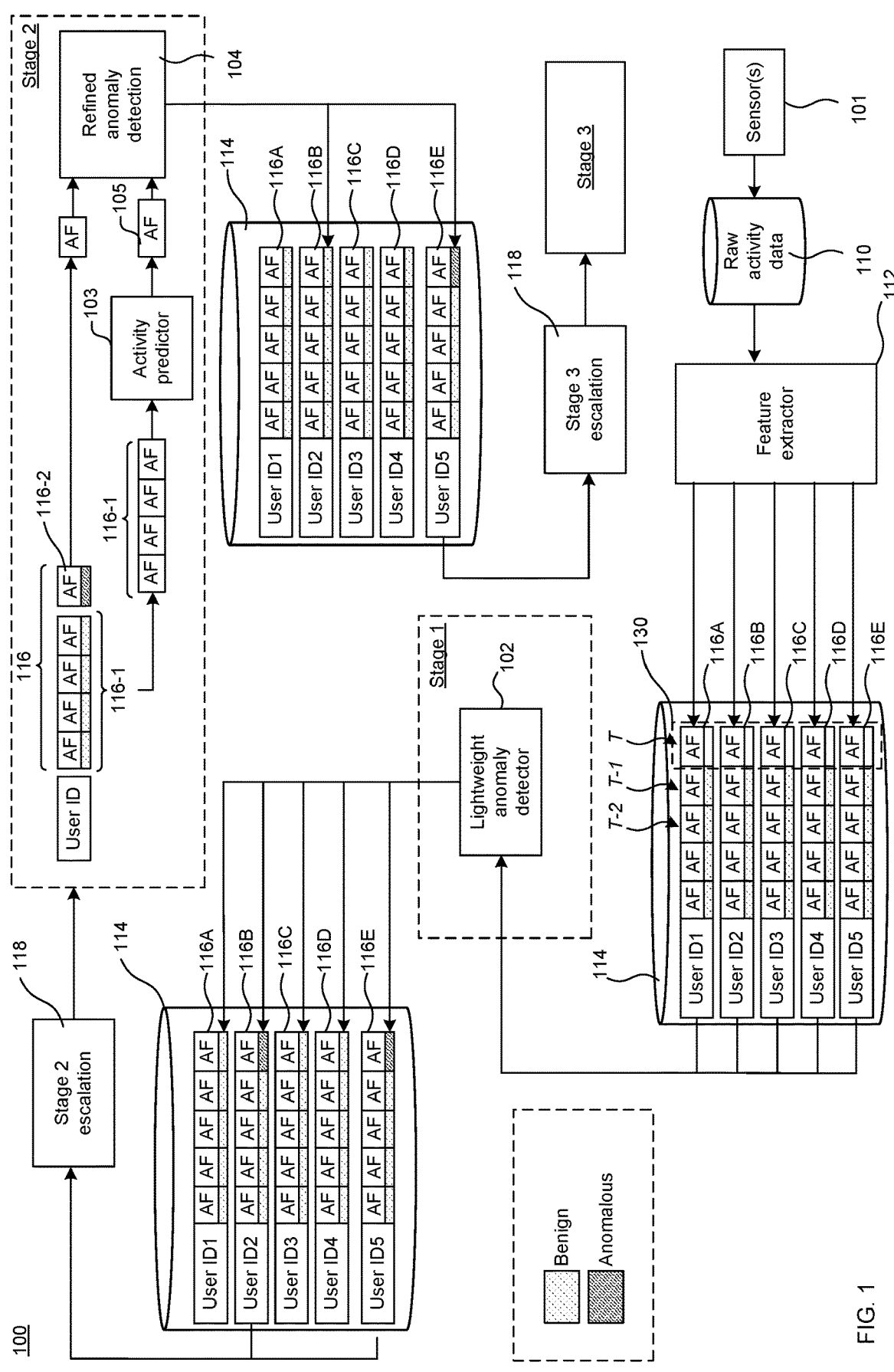
FIG. 1 shows a schematic function block diagram of a system for detecting and mitigating cyberthreats.

Excessive lateral movement by ransomware attackers using stolen credentials constitutes an abrupt deviation from legitimate user behavior, which can be leveraged to detect compromised accounts and, in turn, provide an opportunity to uncover HumOR attackers before they start encrypting data or locking access. However, detecting deviations from normal behavior in an enterprise network poses significant practical challenges. Diversity of user activities makes it challenging to accurately identify deviations from normal behavior. Attackers may also attempt to blend in with legitimate user activities, further complicating the detection process.

It is difficult to model and monitor behaviors effectively in a large enterprise with diverse user activities. Attackers may mimic legitimate users to avoid detection. It is hard to obtain labeled data, especially known compromised accounts. Account compromising is rare in an enterprise network, and most users and accounts are benign. The activity data for model training may include compromised account activities, making the problem more complex.

To address the challenges of diverse and evasive activities in enterprise accounts, an insight that most accounts exhibit fixed and repetitive patterns is leveraged. When an account is compromised during lateral movement, the attacker's behavior should deviate significantly from the normal user's behavior. An approach is described, which models each account's behavior individually and detects deviations to identify compromised accounts. This approach also addresses the challenge of scarce labeled data, as it employs unsupervised machine learning to model individual account behavior and detect deviations. No labeled data is needed for training (though a relatively small amount ground truth may be beneficial for performance evaluation).

In certain embodiments, a time series-based anomaly detection method is provided, which is able to identify anomalous user accounts highly effectively. A transformer is used for this purpose. A transformer is a form of sequence-based neural network (meaning a neural network that consumes and processes sequential inputs) with an attention-based architecture. In the following examples, a transformer is trained to generate an activity prediction based on an observed activity sequence associated with a user account. An activity sequence means a time-series of activities. Each activity is an element of the activity sequence, and may for example take the form of an activity feature vector or scalar associated with the user account in a particular observation period (such as a one day period). The activity prediction is then compared with a further observed activity corresponding in time to the predicted activity (e.g. both relating to a common observation period, which may be earlier or later in time than the observed activity sequence used to make the prediction). The observed activity is classified as anomalous or benign based on an extent to which it matches the predicted activity (e.g., which may be quantified by an anomaly score). Anomalous activity associated with a user account is flagged as potentially indicating that the user account has been compromised. Whilst a transformer is used in certain embodiments described herein, other forms of sequence-based neural network or other forms of sequence-based machine learning (ML) models may alternatively be used in place of the described transformer.

Importantly, the described anomaly detection method is unsupervised (or self-supervised), meaning the transformer (or other series-based ML model) can be entirely trained on examples of observed activity that are not explicitly labelled as anomalous or benign. Training examples are constructed from training activity sequences (that is, observed activity sequences forming part of a training set) as follows: each training activity sequence is split into two parts, with a first part being designated as an input and a second part being designated as a training target. In training, the transformer learns to predict the second part of the sequence (the target) based on the first part of the sequence (the input). Note, the second part may come after the first part in the time series (forward prediction) or before the first part (backward prediction). Two insights are leveraged in this context. Firstly, in a large training dataset of benign activity, the vast majority of that activity will be benign in practice. Therefore, once trained, the predicted activity output of the transformer will correspond to expected benign activity. The possible presence of a small number of anomalous activity datapoints in the training set will have a negligible impact on the ability of the transformer to accurately predict benign behavior. Secondly, anomalous activity may be predicted based on deviation between observed activity and a corresponding benign activity prediction generated by the transformer (the transformer need not attempt to predict anomalous activity).

Additional practical challenges are also addressed. In conventional security systems, significant storage and computing resources are needed to log and monitor user activities, potentially disrupting users' regular use of such computing resources. These issues are particularly acute with large number of users and extensive activity volumes associated with larger organizations.

In certain embodiments, a multi-stage anomaly detection architecture is used. In a first stage, a light-weight form of anomaly detection is used to 'triage' observed activity. Activity is only escalated to a second-stage anomaly detection if it is classed as anomalous in the first stage (that is, only positive detections are escalated). In the second stage, time series-based anomaly detection is used to refine the positive detections obtained in the first stage, which may result in activity that was classed as anomalous in the first stage being re-classified as benign in the second stage. In practice, most activity is benign, and only a small percentage of the observed activity will be escalated to the second stage. The first stage can be implemented using significantly fewer computing resources than the second stage, meaning that, overall, high-performance anomaly detection is achieved with significantly improved computational efficiency.

Activity classed as anomalous using time series-based prediction (e.g., whose anomalous classification is confirmed in the second stage) may be escalated to a third stage, which means triggering a cybersecurity mitigation action in relation to a user account associated with the activity in question. Such action may, for example, comprise automatically locking or isolating the user account, removing or restricting privileges associated with the user account, or generating an alert identifying the user account at a user interface (e.g., to prompt a review by a human security expert). Alternatively or additionally, such action may comprise gathering additional details relating to the user account (above and beyond the activity used for anomaly detection) and using an additional detection component make a further determination of the status of the user account.

The third stage may involve analyzing (manually or automatically) more activities, verifying activities with the account owner, monitoring the account, and implementing risk mitigation measures like pausing or revoking high-impact privileges. This stage is customizable for each account's verification and aims to maintain a manageable workload in the third stage.

FIG. 1 shows a schematic function block diagram of a system 100 for detecting and mitigating ransomware attacks.

The system 100 is able to detect and mitigate HumOR attacks in particular, in a practical and computationally-efficient manner. The system 100 identifies potential account hijacking by continuously monitoring user behavior and detecting deviations from normal user behavior patterns. In this manner, the system can protect a network (e.g., enterprise network) from human-operated ransomware by identifying compromised accounts during lateral movement though multi-stage anomaly detection.

As discussed, HumOR typically moves laterally, stealing credentials and escalating privileges to locate valuable data for ransomware attacks. As HumOR compromises an account during its lateral movement, its behavior should significantly deviate from that of the legitimate user, enabling the identification of compromised accounts and the detection of HumOR. This insight is leveraged within the system 100, which models an account behavior to identify accounts exhibiting significant deviations from legitimate user behavior for further analysis and verification. This approach allows early identification of potential threats and appropriate protective actions.

To address both the diversity of user activities and the evasion of detection by blending in with legitimate user activities, the system 100 leverages the fact that most user accounts (and particularly enterprise accounts) exhibit fixed and repetitive activity patterns. The system 100 monitors individual account behavior and detects deviations from past behavior history.

User activity data 110 is collected from one or more sensors 101 deployed within a computer infrastructure. For example, sensors may be deployed to endpoint devices (such as user devices, servers etc.) within a network, and collect and report user activity data. Such 'raw' activity data is a form of telemetry that may be stored in a telemetry database or databases.

A feature extractor 112 processes the user activity data 110 into activity sequences stored in an activity database 114. Each activity sequence is associated with a user account. In the following examples, each activity sequence comprises a time sequence of activity feature vectors ('AF' denoting an activity feature vector in this case), where each activity feature vector is associated with an observation period. The activity feature vector aggregates and summarizes user activity within its associated observation period. One day observation periods are considered in the following examples. However, longer or shorter observation periods may be used in other embodiments.

To minimize the impact on normal user activities and reduce the workload of logging and monitoring, in certain embodiments, the system 100 extracts and monitors only core networking and logon activities, which are efficiently encoded in the activity feature vectors. In one illustrative example, twelve features (that is, twelve-dimensional activity feature vectors) are used, as detailed in Table 1. These twelve features have been carefully chosen, prioritizing security value while considering performance and data collection costs in real-world scenarios. The features of Table 1 also satisfy user privacy requirements. Nevertheless, it is important to note that the system 100 can be extended with additional or alternative features.

Purely for the sake of illustration, first to fifth activity sequences 116A, . . . , 116E are shown (each of length five) associated with first to fifth user accounts respectively. The user accounts are identified by respective user identifiers (User ID1, . . . , User ID5), such as local accounts or domain accounts within a network. The length of an activity sequence means the number of observation periods it spans. In practice, any number of activity sequences may be considered, spanning any number of observation periods. Activity sequences need not be of fixed length, meaning different activity sequences may have different lengths.

Activity feature vectors are generated per user account, taking into account both activity type and the number of machines on which a given activity type is detected in association with the user account. It is useful to capture the latter in the activity feature vectors since an abnormal rise in the number of machines on which a given user account is active can be a sign of lateral movement.

TABLE 1

Twelve activities collected for each user.

| Feature ID | Feature name |
| --- | --- |
| Feature 1 | PsExec activity |
| Feature 2 | PaExec activity |
| Feature 3 | SBM File Transfer |
| Feature 4 | WMI activity |
| Feature 5 | Scheduled task creation |
| Feature 6 | Remote service creation |
| Feature 7 | Remote interactive logon activity |

TABLE 1-continued

Twelve activities collected for each user.

| Feature ID | Feature name |
| --- | --- |
| Feature 8 | Overall logon activity |
| Feature 9 | Windows Defender configuration modification 1 |
| Feature 10 | Windows Defender configuration modification 2 |
| Feature 11 | NetrSessionEnum activity |
| Feature 12 | NetrShareEnum activity |

A current observation period is denoted by index T, with preceding observation periods denoted T−1, T−2 etc.

In the present example, activity sequences are grown over time, anomaly detection is performed on an ongoing basis as further user activity is observed. Hence, when activity feature vectors are generated for observation period T, the preceding activity feature vectors have already been classified as anomalous or benign. In the example of FIG. 1, each activity sequence 116A, . . . , 116E is formed by augmenting an existing activity sequence (each element of which has already been classified as anomalous or benign) associated with the applicable user account with an additional activity feature vector for the current observation period T.

The system 100 implements a multi-resolution, multi-stage approach that takes advantage of the fact that most accounts in an enterprise network are benign. In a first stage, a first ('lightweight') anomaly detector 102 uses coarse behavior monitoring by grouping normal user activities according to their activity patterns and modeling each activity pattern automatically with a benign behavior distribution. The benign behavior distribution may for example take the form of a Poisson distribution. The first stage effectively filters out the majority of benign accounts.

In the first stage, the lightweight anomaly detector 102 is applied to the activity sequences 116A, . . . 116E held in the activity databases, in order to initially classify each activity feature vector for the current observation period T as anomalous or benign. In this example, earlier observation periods (T−1 and earlier) have been classified previously, so only the most recent observations (the activity feature vectors in the current observation period T, denoted by reference sign 130) are classified at this point. The approach described herein extends to real-time detection use-cases, as well as periodical or latent detection use-cases. In one implementation, the multi-stage anomaly detection process is run once per observation period, at the end of the current observation period (based on a complete set of data for the observation period). In another implementation, the process is run multiple times throughout the observation period, initially on partial data. For example, with a one day observation period, the process could be run every few minutes to update the anomaly feature vectors 130 in the current observation window, and the anomaly scores/classifications for the current observation period as new activity data comes in. This implementation enables real-time detection (e.g., every minute or so) regardless of the observation period length.

Accounts with anomalous behaviors identified in the first stage are sent to a second stage for further processing. Purely by way of illustration, FIG. 1 shows the current activity feature vectors in the second and fifth activity sequences 116B, 116E as having been classified as anomalous in the first stage, and all other current activity feature vectors as having been classified benign in the first stage. Hence, in this example, a first escalation component 118 escalates only the second and fifth activity sequences 116B, 116E to the second stage. At this point, the second and fifth user accounts are provisionally classed as anomalous.

The second stage employs fine behavior monitoring by leveraging individual account activity history to detect deviations. An activity predictor 103 is used in the second stage. In the present example, the activity predictor 103 takes the form of a single Deep Neural Network (DNN)-based time-series prediction model. As described above, the activity predictor 103 is used to model normal behaviors of individual accounts and to assess an extent to which a current behavior associated with differs from its past normal behavior. In the present example, the behavior comparison is achieved as follows.

FIG. 1 shows an activity sequence 116 processed in the second stage, e.g. corresponding to the second activity sequence 116B or the fifth activity sequence 116E. The activity predictor 103 receives a first part 116-1 of the activity sequence 116 as input. A refined anomaly detector 104 receives a second part 116-2 of the activity sequence (which is not inputted to the activity predictor 103) as a first input. The activity predictor 103 generates an activity prediction 105, which corresponds in time and in form to the second part 116-2 of the activity sequence 116. The refined anomaly detector receives the activity prediction 105 as a second input and compares the second part 116-2 of the activity sequence with the activity prediction 105.

In the present example, the second part 116-2 of the activity sequence 116 is the activity feature vector for the current observation period T and the first part 116-1 is all the preceding activity feature vectors.

Based on the comparison, the refined anomaly detector 104 classifies the second part 116-2 of the activity sequence 116 as anomalous or benign. In the present example, this means re-classifying the current activity feature vector as anomalous or benign. For example, the refined anomaly detector 104 may compute an anomaly score quantifying deviation between the second part 116-2 of the activity sequence 116 (the current activity feature vector in this case) and the corresponding activity prediction 105. An account may be classified as anomalous or benign based on a threshold applied to the anomaly score.

In the example of FIG. 1, the second stage anomaly detection results in the second user account associated with the second activity sequence 116B being downgraded to benign, but the first user account associated with the fifth activity sequence 116E retaining its anomalous classification.

Accounts with large deviations that are classed as anomalous in the second stage (such as the fifth user account), termed positive accounts herein, are detected for further analysis in a third stage. A second escalation component 120 escalates such accounts to a third stage, which means triggering a cybersecurity action in relation to each positive user account.

In one embodiment, the third stage involves human intervention to determine if each positive account is genuinely compromised. This process may include extracting additional activities for analysis, verifying activities with the account owner, actively monitoring activities of the account until a decision is made, and taking proactive steps to mitigate potential risks, such as pausing or revoking high-impact privileges. An alert may be generated at a user interface to prompt such action. In other embodiments, one or more such actions may be performed automatically in response to identifying a positive user account.

The system 100 is able to detect accounts with anomalous behavior while keeping the total number of positive accounts manageable for human and/or automated intervention in the third stage.

The system 100 can provide large-scale defense to protect enterprise networks from HumOR. It achieves a good balance between detection accuracy and the feasibility of large-scale deployment. The multi-stage process above is complementary to existing defenses against ransomware attacks and other threats. It can be seamlessly integrated into existing security frameworks, providing a powerful tool for security analysts and incident response teams to detect and respond to potential security threats.

The multi-resolution, multi-stage method is highly scalable, striking a balance between system complexity and detection capabilities.

The system 100 operates transparently without disrupting normal user activities.

Moreover, the system 100 collects minimal activity data to reduce system overhead, while maintaining a reasonable chance of detecting compromised accounts.

The system 100 achieves high detection rate with an extremely low false positive rate. For practical deployment, a large enterprise cannot tolerate many false positives due to the high cost of investigation. The system 100 achieves a balance between a low false positive rate and a high detection rate of compromised accounts.

Data Collection

Before collecting data, it is useful to identify which user accounts in an enterprise should be modeled and monitored. By analyzing user types within an organization and considering their potential to be compromised and utilized for lateral movement, one embodiment focusses on domain accounts, each represented by a unique Security Identifier (SID). Collected activity data should be closely related to lateral movement activities to distinguish compromised from normal accounts. For the sake of illustration, the following examples focus on enterprises with networked machines running mainly various versions of Windows servers and desktops.

The sensor(s) 101 of FIG. 1 gather user activities routinely performed between Windows machines in a network domain, including network logons, SMB file transfers, file share access, administrative tool usage, and security product configurations. Twelve activities, used as features, are collected as shown in Table 1. They cover typical network activities of both regular and administrative users, while being exploited for lateral movement, ransomware spreading, and other attacks. Most users frequently perform network logons, SMB file transfers, and file share access, but rarely use administrative tools. However, usage patterns may vary across organizations and users. A sudden increase in some features could signal lateral movement for some cases but not others.

For each account, the feature extractor 112 collects the number of times it performed each network activity under consideration (e.g. each activity listed in Table 1) on separate machines per day. In this case, the activity feature vectors forming part of an activity sequence counting activity counts pertaining to the user and machine in question. By focusing on the number of distinct machines accessed daily rather than the total number of times each activity was performed, lateral movement and spreading activity are emphasized, and data collection is simplified. In the present example, each feature is a unique-machine-per-user count on a predefined activity, which means a count of unique user-machine interactions within a given observation period.

In other words, within each time period, the number of machines on which a defined activity has been detected in association with a given user account is counted, regardless of the number of times such activity has been detected on each of those machines individually (e.g., if a user logged in once into 100 machines within a given observation period, the value of a log-on count would be 100; whereas if the user logged 100 times into one machine in a given observation period, the value would be 1).

First Stage

The second stage processing is computationally expensive. To reduce the computational burden, the first stage leverages the fact that most enterprise users are benign to implement a simple and fast processing layer to filter out most benign accounts and only send suspicious ones to the second stage. This is a practical approach that balances efficiency and detectability.

Users may exhibit varying levels of logon and network activities, with the same user also experiencing fluctuations in activity levels (e.g., low on weekends, high on specific days) or workloads. These differences result in diverse action patterns in their time-series data, causing the same behavior to indicate opposite scenarios. For instance, small activity spikes could signal compromise for mostly inactive accounts but be mere noise for very active accounts like administrators. Different account types and activity periods have distinct activity distributions.

In one embodiment, at least one benign activity distribution, e.g. in the form of at least one Poisson distribution, is fitted to collected data for use in the first stage. A Poisson Mixed Model (PMM) is used to capture various activity count patterns among and within accounts. A Poisson distribution is a discrete probability distribution that expresses the probability of a given number of events occurring in a fixed interval (activity counts within the current observation period in this case). It is thus well suited to modelling the discrete activity counts captured in the activity feature vectors. A PMM comprises multiple component PMMs that can be used to model different categories of activity. The PMM is an unsupervised model that can be applied to unlabeled data.

Figure 1A:
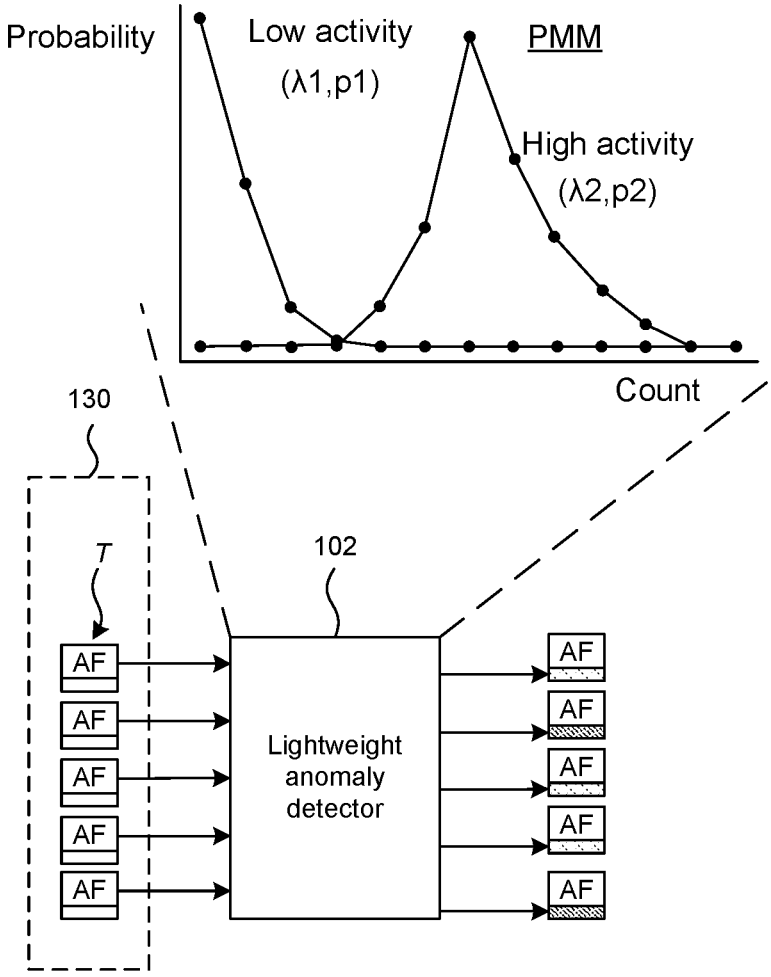
FIG. 1A shows details of a first stage anomaly detector.

FIG. 1A shows further details of the lightweight anomaly detector 102 of the first stage, which fits a PMM to the current activity feature vectors 130, and uses the PMM to classify the current activity feature vectors 130 as anomalous or benign. In some implementations, the PMM may be fitted to the current activity feature vectors 130, in addition to activity feature vectors from one or more earlier time periods.

Purely by way of example, the PMM is shown to comprise two component Poisson distributions, each having a rate parameter ($\lambda1$ and $\lambda2$ respectively) and a mixing proportion (p1 and p2 respectively). A univariate PMM is shown which models a single activity count. With multiple activity count types (features), a multivariate Poisson distribution may be used (which can capture independence between features) or each activity count type may be modelled as an independent univariate PMM (assuming feature independence). With multiple features, each distribution has a rate parameter per feature (e.g. twelve rate parameters per distribution with twelve features), and multivariate PMM includes additional dependency parameters to capture dependencies between features. The rate parameters, mixing proportions and (where applicable) dependency parameters are fitted to the current activity feature vectors 130 using a training algorithm such as Expectation-Maximization. In one implementation, a univariate PMM is learned for each feature, and a combined score (e.g., Fisher Exact score) is used to capture a combined p-value for all features.

The PMM is fitted live during runtime to the current activity data 130, for each new activity data point. Thus, the PMM is trained on the same activity data to which it is applied. For example, this training could take place at the end of each observation period (to the full set of activity data within the observation period), or at multiple times throughout the observation period (based on partial activity data initially) depending on the implementation.

The probability of an observation under a given component Poisson distribution is calculated based on its rate parameter and its mixing proportion. An observation is assigned to the component Poisson distribution under which it has a highest probability. As such, each activity vector is assigned to a single Poisson distribution in the first stage. This, in turn, enables threshold-based anomaly detection to be performed on each observation based on the component distribution to which it is assigned. A thresholds or thresholds for deciding anomalies are updated periodically. The threshold is selected manually in one embodiment. In another embodiment, the threshold is selected automatically, e.g. using chi-square based on the number of features (degrees-of-freedom).

One example embodiment uses two component Poisson distributions, e.g. with different means and/or different rate parameters, with one modeling relatively high activity and the other modeling relatively high activity, as depicted in FIG. 1A. In the present context, these distributions might generally align with workday activity and non-workday activity respectively. They might also have some alignment with different user groups, such as admins and non-admins. It is important to note that, whilst only two component distributions are shown, in general a PMM with any number of distributions can be used to model any desired number of activity classes.

Note that, whilst the PMM can split the user activity into two groups, low-activity and high-activity days, and look for anomalies from the appropriate distribution, if the data has relatively low variance, the PMM may retain all data points and model the data in one distribution.

Whilst the above examples compare only the feature vectors in the current observation with the PMM, in other implements multiple elements of each activity sequence may be compared with the PMM in the first stage for anomaly detection.

For example, in one embodiment, the system 100 calculates a standard deviation of each account's activity sequence. If it is high (e.g. above a threshold), an Expectation Maximization (EM) algorithm is used to split the activity sequence into a high-activity portion and a low-activity portion. More generally, the activity sequence may be divided into portions of different activity categories, and those portions compared with benign activity distributions specific to those activity categories. In one implementation, the trained PMM is applied to the current observation period, but is fitted to a large volume of data that includes previous observation periods. By splitting activity sequences that extend over multiple observation periods into (in this case) high and low activity portions, different component distributions can be trained on high and low activity subsets of the activity data respectively. As indicated, this is merely one example, and the techniques can be extended to activity classes other than 'high' and 'low' activity, with any number of component distributions corresponding to the chosen activity classes.

The system 100 then applies a PMM to model all accounts time-series sequences for each activity. Before testing an account for the current observation period, a minimum number of active features is obtained with some activity in the current observation period that meets specific criteria compared to the user's historical data. Time-series with too few observations are ignored; however, the system 100 models features that were inactive before and active only in the observation period with a negative binomial distribution.

To test an account for the current observation period, the system 100 compares its activity count data to the most suitable distribution in the model and calculate a p-value for that distribution. A p-value is a measure of the probability that an observed difference could have occurred just by random chance. The p-values for all features are aggregated to determine an anomaly score for the account. A threshold on the p-value (or combined score) is used for anomaly detection in this case, and as noted the threshold may be updated periodically. Alternatively, an observation may be identified as anomalous based on a threshold (which may also be updated periodically) applied to the number of standard deviations it lies from the mean.

Accounts with high anomaly scores are provisionally classified as anomalous, and sent to the second stage for further processing. At its core, this stage divides activity sequences (user activity count time-series data in this example) into groups with similar patterns and models each's activity count data with a Poisson distribution to identify deviations from these patterns to identify anomalous accounts for further processing in subsequent stages. By doing so, it effectively filters out most benign accounts.

In an extension of the above techniques, different distributions (or different PMMs) may be associated with different user groups (such as 'admins' and 'non-admins'). In this case, activity feature vectors may be explicitly assigned to a given distribution (or a given PMM) based on their associated user identifiers.

Second Stage

Most benign accounts are filtered out by the first stage's group-behavior analysis, leaving only accounts with some anomalous count data in at least one of the 12 features on the observation day. This changes the data distribution for the second stage, making it harder to separate compromised and benign accounts based on their behaviors.

Figure 2:
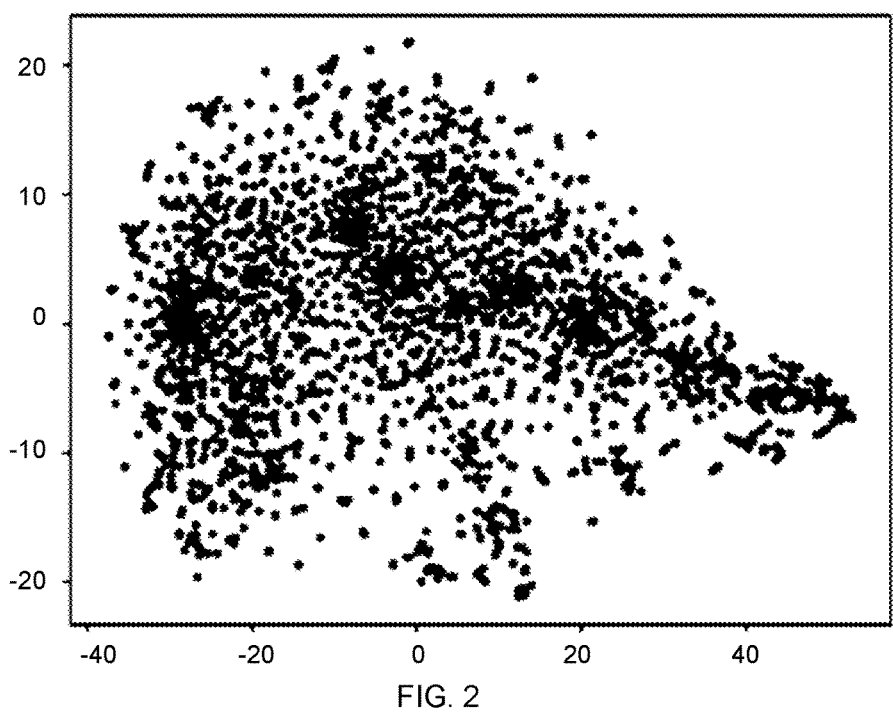
FIG. 2 shows a feature plot of second-stage activity data.

FIG. 2 shows a t-distributed stochastic neighbor embedding (T-SNE) map of a set of example time-series data from the first stage. T-SNE reduces high-dimensional data to a two or three-dimensional map for visualization. The figure reveals that the remaining accounts have no clear clustering patterns, as the first stage successfully removed many users with low-activity or high-activity profiles and consistent behaviors as benign.

The first stage can therefore be seen to be operating as intended. Nevertheless, this poses a challenge for the refinement of the second stage. To address this challenge, the system 100 employs advanced detection techniques in the second stage with higher complexity than the first stage. Since most accounts have been filtered out by the first stage, it is feasible to use more sophisticated modeling to analyze accounts behavior at a finer resolution in the second stage. In one embodiment, deep learning techniques are used to model behavior of each individual account considered in the second stage.

As indicated, DNN-based unsupervised learning is leveraged to learn time-series sequences and predict the current observation period's activity count data from the account's past activity count data. If the current behavior matches its past behavior, the prediction error should be small. If not, such as when an account is compromised and used by an adversary, the prediction error should be large and indicate compromise. As noted, this unsupervised approach does not need labeled data for training.

To save computational resources, the activity predictor 103 used in the second stage is implemented a single model in the following examples, which is used to predict all accounts' normal behavior (instead of one model per account).

High performance is achieved with a powerful transformer model that can handle diverse behavior patterns across many accounts, and which can generalize well to untrained time series.

The transformer has a self-attention mechanism that can capture long-range dependencies and complex temporal patterns. Transformers also demonstrate strong generalization capabilities, effectively handling variations and uncertainties in time-series data. Additionally, the transformer can process sequences in parallel, resulting in faster training and inference times.

One example of a suitable transformer architecture is the Informer architecture described in Haoyi Zhou, Shanghang Zhang, Jieqi Peng, Shuai Zhang, Jianxin Li, Hui Xiong, and Wancai Zhang. Informer: Beyond efficient transformer for long sequence 17 time-series forecasting. In Proceedings of the AAAI Conference on Artificial Intelligence, volume 35, pages 11106-11115, 2021.

Figure 3:
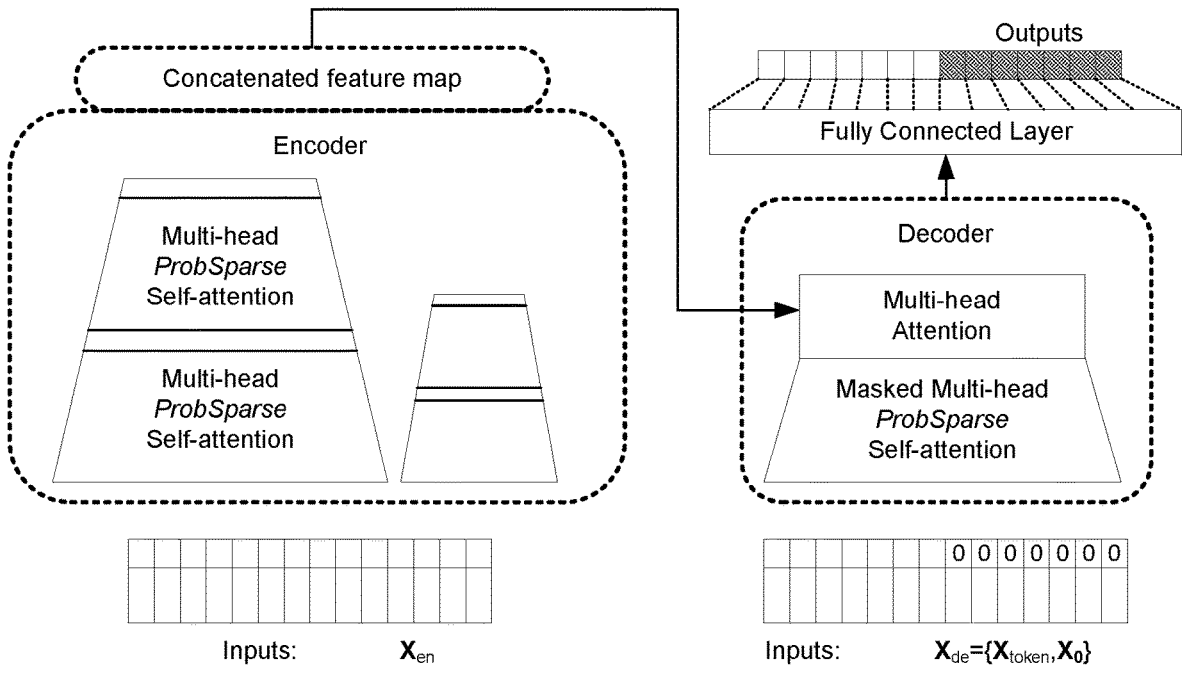
FIG. 3 shows an example transformed neural network architecture.

FIG. 3 shows a schematic overview of the transformer architecture used in the present context. It employs an encoder-decoder architecture based on ProbSparse self-attention and achieves $O (L \log L)$ in time complexity and memory consumption for an $O (L)$ input sequence, while typical transformers have $O (L 2)$ complexity. Moreover, the self-attention distilling design has cascading layer input and efficiently handles long input sequences, which provides strong capability in modeling in-sequence element dependency. This property enables the transformer to effectively model extended sequences with greater stability, making it highly suitable for the present application.

A challenge in the second stage is training the activity predictor 103 using accounts' benign behaviors. Addressing this challenge is difficult due to the lack of labeled data in the real world, reflecting that fact that it is usually not known whether an account is compromised or not.

The solution described herein leverages the following insights.

Even after removing most benign accounts in the first stage, most accounts in the second stage are still benign.

Moreover, for any account, most of its long-term activity data should be benign since a long history of malicious activity data significantly increases the chance of being detected (e.g. though other forms of security investigation), against the covert nature of HumOR.

Moreover, an Informer-based time-series prediction model trained on mostly benign data can effectively capture benign behaviors, even with a small portion of malicious behaviors.

It has been verified empirically that the activity predictor 103 does not overfit to these noisy malicious behaviors, and still produces large prediction error for these malicious data.

For an account in the second stage, its activity on the observation day may be anomalous, but earlier activity is likely normal. Otherwise, it would have been sent to the second stage earlier.

Leveraging these insights, an effective model training method is described. For each account in the second stage, the system 100 samples its early time series data for training, as it likely represents normal behavior. Note, training data used to train the activity predictor 103 is thus obtained specifically from only the subset of user accounts escalated from the first stage to the second stage, as this better reflects the data the trained activity predictor 103 will be exposed to.

Figures 4, 5:
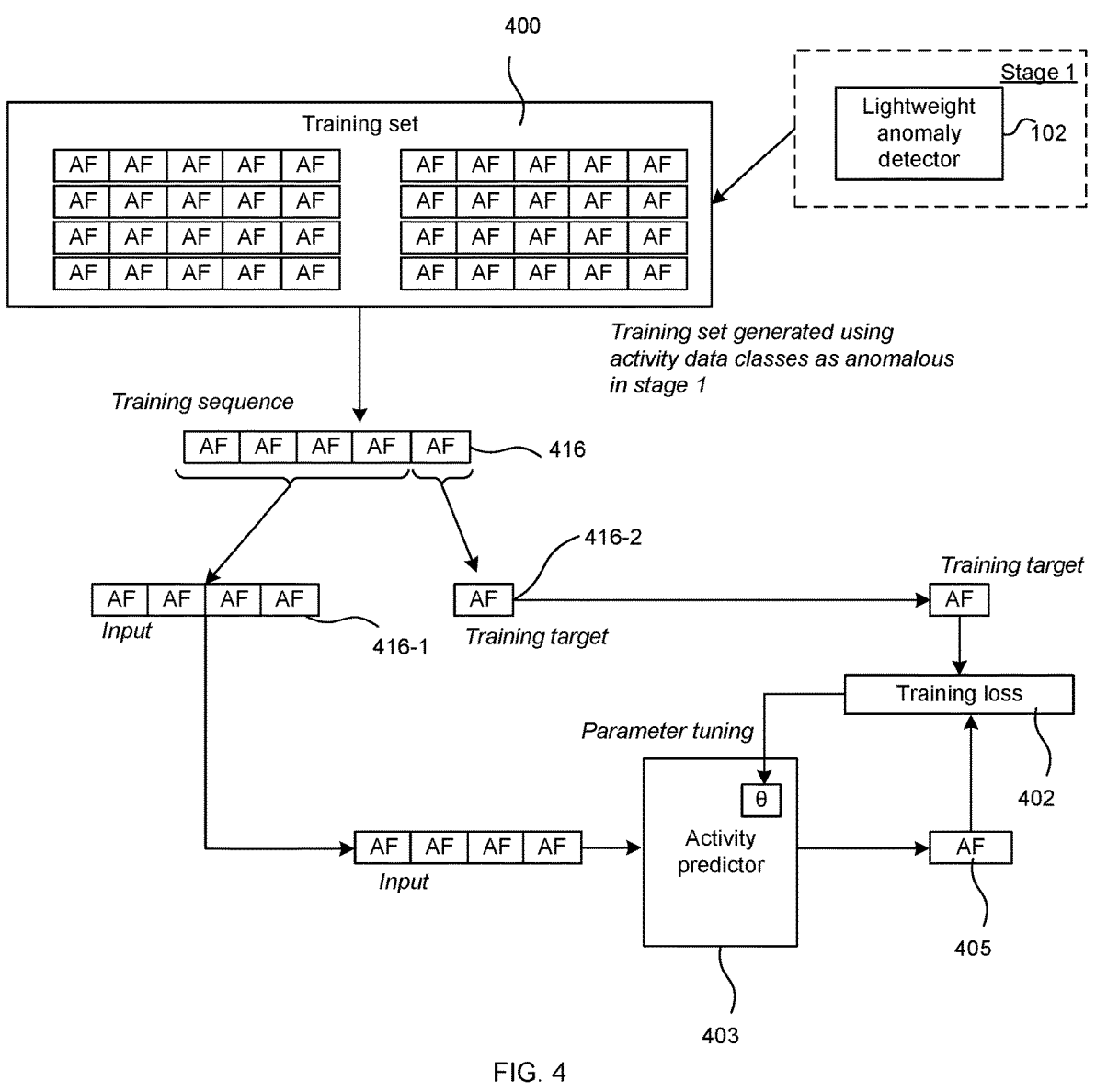
FIG. 4 shows a block diagram of an activity predictor training setup.
FIG. 5 shows timeseries charts of illustrative anomalous activity and non-anomalous activity.

FIG. 4 shows a schematic block diagram of a training setup for an activity predictor 403. The activity predictor 403 of FIG. 4 is trained in the manner described below, resulting in the trained activity predictor 103 deployed in the system 100 of FIG. 1. As indicated, the activity predictor 403 is a machine learning model, such as a transformer or other sequence-based neural network.

The activity predictor 403 is trained on a training set 400 made up of training activity sequences, which are specifically activity sequences that have been classed an anomalous in the first stage, by the lightweight feature detector 102 (that is, in which the lightweight anomaly detector 102 has identified an anomalous feature vector).

Each training activity sequence 416 is split into two non-overlapping parts: a second part 416-2, which in this example is the final feature vector contained in the training activity sequence 416, and a first part 416-1, which in this example is all of the preceding feature vectors in the training activity sequence 400.

The second part 416-2 is used as a training target (the ground truth), whilst the first part 416-1 is inputted to the activity predictor 403. Based on the inputted part 416-1, the activity predictor 406 generates an activity prediction 405, which corresponds in form to the training target 416-2. In this example, the activity prediction is therefore a single predicted feature vector. A training loss function 402 is defined, which quantifies error between the training target 416-2 and the activity prediction 405, aggregated across the training set 400. Parameters θ of the activity predictor 403 are tuned based on the training loss 402, with the objective of minimizing this error. For example, a gradient-based approach (such as gradient descent or ascent with backpropagation) may be used to tune the parameters θ based on a gradient of the training loss function 402 with respect to each training parameter.

In other implementations, multiple feature vectors from the training activity sequence may be used at the training target, in which case the activity prediction also comprises multiple feature vectors.

In addition or as an alternative to the forward prediction described above, a second element of a sequence can be used to predict past anomalous behavior occurring in a first element of the sequence preceding the second element (a form of backwards prediction). In that case, the training would be similar to FIG. 4, but with the training target as the first element and the training sequence as the second element. This implementation is useful to detect past anomalies, either for detection of abnormal behavior, or for exclusion from the training data (e.g., to refine the training set for the normal behavior by removing pas anomalies).

Detection of Positive Accounts

FIG. 5 shows two illustrative activity patterns: low activity counts (Left) and high activity counts (Right). Datapoints 502, 504 spots indicate the predicted data for the current observation period (the last observation period of the timeseries), while all other datapoints mean are observed activity counts (used to generate the predicted datapoints 502, 504)

To detect compromised accounts, the system 100 uses a defined metric to measure behavior deviations with the following properties:

a. Activity Spikes Only. Activity spikes are generally only pertinent when the observed activity count for a given period is much higher than the predicted normal count, as in the left figure of FIG. 5. Such spikes may indicate malicious actions by compromised accounts. "Negative spikes", when the observed count is lower than the predicted one, as in the right figure of FIG. 5., are generally not considered pertinent, since they may reflect less activity by legitimate users, e.g., on vacation.

b. Normalized Metric. Similar spikes may be significant for an inactive account, as in the left figure of FIG. 5, but not for a highly active one. The metric accounts for the variation in activity levels across accounts.

As discussed, denoting T as the current observation period, the activity predictor 103 uses data from days 1 to T−1 as characteristic of normal behavior to predict normal activity for the current observation period, resulting in the activity prediction 103 of FIG. 1.

The refined anomaly detector 104 computes an anomaly score based on the activity prediction 105 and the corresponding activity for the same observation period (the second part 116-2 of the activity sequence 116) as follows:

$$M = \sum_{i=1}^{12} \frac{\max\{\hat{y}_i^T - y_i^T, 0\}}{s_i^2(\sigma_i^{1:T-1})^2} \equiv \sum_{i=1}^{12} M_i, \tag{1}$$

where i is a feature index (e.g. from 1 to 12 for the 12 features of Table 1), $y^{-T}$ and $y^T$ are the prediction and the actual activity value for the current observation period T, respectively, $s_i^2$ is a global variance of all activities for all users for feature i from day 1 to day T−1, $$(\sigma_i^{1:T-1})^2$$

is a user-specific variance for feature i from observation period 1 to observation period T−1, and Mi is a malicious score for feature i, referred to as feature-malicious score, computed as $$M_i = \frac{\max\{\hat{y}_i^T - y_i^T, 0\}}{s_i^2(\sigma_i^{1:T-1})^2} \tag{2}$$

If the anomaly score M exceeds a threshold, the system 100 flags the account as positive (potentially compromised), and passed it to the third stage for further scrutiny.

Note, the anomaly score M is normalized based on a normalization factor that is specific to the user account, being derived from the activity subsequence for observation periods 1, . . . , T−1 associated with the specific user account (the first part 116-1 of the activity sequence 116 of FIG. 1 in this example). Hence, an activity feature vector classed as anomalous in one context (for a given user account and a given observation period) might not be classed as anomalous in another context (e.g. in a different observation period for the same account, or the same or different observation period for a different account).

Whilst the above examples generate an activity prediction for a single observation period, this can be extended to multiple observation periods. Equation 1 can be generalized to a sequence of observation days by using data before them to predict each observation day and obtain the maximum score.

FIG. 6 schematically shows a non-limiting example of a computing system 600, such as a computing device or system of connected computing devices, that can enact one or more of the methods or processes described above, including the filtering of data and implementation of the structured knowledge base described above. Computing system 600 is shown in simplified form. Computing system 600 includes a logic processor 602, volatile memory 604, and a non-volatile storage device 606. Computing system 600 may optionally include a display subsystem 608, input subsystem 610, communication subsystem 612, and/or other components not shown in FIG. 6. Logic processor 602 comprises one or more physical (hardware) processors configured to carry out processing operations. For example, the logic processor 602 may be configured to execute instructions that are part of one or more applications, programs, routines, libraries, objects, components, data structures, or other logical constructs. The logic processor 602 may include one or more hardware processors configured to execute software instructions based on an instruction set architecture, such as a central processing unit (CPU), graphical processing unit (GPU) or other form of accelerator processor. Additionally or alternatively, the logic processor 602 may include a hardware processor(s)) in the form of a logic circuit or firmware device configured to execute hardware-implemented logic (programmable or non-programmable) or firmware instructions. Processor(s) of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 602 may be virtualized and executed by remotely accessible, networked computing devices configured in a cloud-computing configuration. In such a case, these virtualized aspects are run on different physical logic processors of various different machines. Non-volatile storage device 606 includes one or more physical devices configured to hold instructions executable by the logic processor 602 to implement the methods and processes described herein. When such methods and processes are implemented, the state of non-volatile storage device 606 may be transformed—e.g., to hold different data. Non-volatile storage device 606 may include physical devices that are removable and/or built-in. Non-volatile storage device 606 may include optical memory (e g., CD, DVD, HD-DVD, Blu-Ray Disc, etc.), semiconductor memory (e g., ROM, EPROM, EEPROM, FLASH memory, etc.), and/or magnetic memory (e.g., hard-disk drive), or other mass storage device technology. Non-volatile storage device 606 may include nonvolatile, dynamic, static, read/write, read-only, sequential-access, location-addressable, file-addressable, and/or content-addressable devices. Volatile memory 604 may include one or more physical devices that include random access memory. Volatile memory 604 is typically utilized by logic processor 602 to temporarily store information during processing of software instructions. Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. When included, display subsystem 608 may be used to present a visual representation of data held by non-volatile storage device 606. The visual representation may take the form of a graphical user interface (GUI). As the herein-described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices. When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor. When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the internet. The term computer readable media as used herein may include computer storage media. Computer storage media may include volatile and non-volatile, removable and nonremovable media (e.g., volatile memory 604 or non-volatile storage 606) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 600 or a component device thereof). Computer storage media does not include a carrier wave or other propagated or modulated data signal. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

According to a first aspect herein, a computer system comprises: a memory embodying computer-readable instructions; a processor coupled to the memory, and configured to execute the computer-readable instructions, which upon execution cause the processor to perform operations comprising: receiving an activity sequence associated with a user account; inputting a first part of the activity sequence to an activity predictor; receiving from the activity predictor an activity prediction corresponding in time to a second part of the activity sequence; comparing the second part of the activity sequence with the activity prediction; and responsive to comparing the second part of the activity sequence with the activity prediction, performing a cybersecurity action in relation to the user account.

In embodiments, the cybersecurity action may comprise: generating at a user interface an alert identifying the user account, locking or isolating the user account, or removing or suspending a privilege associated with the user account.

The operations may comprise: comparing an element of the activity sequence with a benign behavior distribution; and selecting the activity sequence for inputting to the activity predictor based on comparing element of the activity sequence with the benign behavior distribution.

The benign behavior distribution may be selected based on a user group with which the user account is associated.

The operations may comprise: identifying a first portion of the activity sequence in a first activity category; training a first benign activity distribution based on the first portion associated with the first activity category; identifying a second portion of the activity sequence in a second activity category; training a second benign activity distribution based on the second portion associated with the second activity category; wherein the activity sequence may be selected based on comparing the element of the activity sequence with the first benign activity distribution and the second benign activity distribution.

The benign behavior distribution may be a Poisson distribution.

The element of the activity sequence may be compared with multiple benign behavior distributions of a mixture model.

The element of the activity sequence may be used to determine the benign behavior distribution.

The activity predictor may be a transformer neural network.

Comparing the second part of the activity sequence with the activity prediction may comprise computing an anomaly score based on: a difference between the activity sequence and the activity prediction, and a normalization factor computed based on the first part of activity sequence.

The normalization factor may be based on a variance of the first part of the activity sequence.

In a second aspect, a method comprises: receiving a training activity sequence associated with a user account; inputting a first part of the training activity sequence to an activity predictor; receiving from the activity predictor an activity prediction corresponding in time to a second part of the training activity sequence; training the activity predictor based on a training loss function that quantifies error between the second part of the activity sequence and the activity prediction, resulting in a trained activity predictor.

The method may comprise comparing an element of the training activity sequence with a benign behavior distribution; and selecting the training activity sequence for use in training the activity predictor based on comparing element of the training activity sequence with the benign behavior distribution.

The element of the training activity sequence may be compared with multiple benign behavior distributions of a mixture model.

The activity predictor may be a transformer neural network.

A third aspect provides-readable storage media embodying computer-readable instructions which, when executed a processor, cause the processor to implement any method, or device or system functionality disclosed herein.

It will be appreciated that the above embodiments have been disclosed by way of example only. Other variants or use cases may become apparent to a person skilled in the art once given the disclosure herein. The scope of the present disclosure is not limited by the above-described embodiments, but only by the accompanying claims.

The invention claimed is:

1. A computer system comprising:
a memory storing computer-readable instructions;
a processor coupled to the memory and configured to execute the computer-readable instructions, which upon execution cause the processor to perform operations comprising:
receiving an observed activity sequence associated with a user account,
the observed activity sequence comprising a time series of activities associated with the user account in an observation period, and
the observed activity sequence having a first part and a second part being later in time than the first part;
comparing the observed activity sequence with a benign behavior distribution;
based on the comparison, filtering out a benign activity from the observed activity sequence to generate a filtered observed activity sequence;
inputting the first part of the filtered observed activity sequence to an activity predictor;
receiving from the activity predictor an activity prediction based on the first part of the filtered observed activity sequence and corresponding in time to the second part of the filtered observed activity sequence, the activity prediction comprising a predicted behavior in the second part of the filtered observed activity sequence;
comparing the second part of the filtered observed activity sequence with the activity prediction to determine an extent to which the second part of the filtered observed activity sequence matches the activity prediction;

based on the extent to which the second part of the filtered observed activity sequence matches the activity prediction, classifying the filtered observed activity sequence as anomalous; and responsive to the classification of the filtered observed activity sequence as anomalous, performing a cybersecurity action in relation to the user account, the cybersecurity action comprising generating at a user interface an alert identifying the user account, locking or isolating the user account, or removing or suspending a privilege associated with the user account.

2. The computer system of claim 1, wherein the benign behavior distribution is selected based on a user group with which the user account is associated.

3. The computer system of claim 1, wherein the operations further comprise, after receiving the observed activity sequence associated with the user account:

identifying a first portion of the observed activity sequence in a first activity category;

training a first benign activity distribution based on the first portion associated with the first activity category;

identifying a second portion of the observed activity sequence in a second activity category;

training a second benign activity distribution based on the second portion associated with the second activity category; and wherein the observed activity sequence is selected based on comparing an element of the observed activity sequence with the first benign activity distribution and the second benign activity distribution.

4. The computer system of claim 1, wherein the benign behavior distribution is a Poisson distribution.

5. The computer system of claim 1, wherein comparing the observed activity sequence with the benign behavior distribution further comprises comparing an element of the observed activity sequence with one or more benign behavior distributions of a mixture model.

6. The computer system of claim 1, wherein an element of the observed activity sequence is used to determine the benign behavior distribution.

7. The computer system of claim 1, wherein the activity predictor is a sequence-based neural network that consumes and processes a sequential input with an attention-based architecture.

8. The computer system of claim 1, wherein comparing the second part of the filtered observed activity sequence with the activity prediction further comprises computing an anomaly score based on:

a difference between the filtered observed activity sequence and the activity prediction, and a normalization factor computed based on the first part of the observed activity sequence.

9. The computer system of claim 8, wherein the normalization factor is based on a variance of the first part of the observed activity sequence.

10. Computer-readable storage media storing computer-readable instructions which, when executed a processor, cause the processor to perform operations comprising:

receiving an observed activity sequence associated with a user account, the observed activity sequence comprising a time series of activities associated with the user account in an observation period, and the observed activity sequence having a first part, and a second part being later in time than the first part;

comparing the observed activity sequence with a benign behavior distribution;

based on the comparison, filtering out a benign activity from the observed activity sequence to generate a filtered observed activity sequence;

inputting the first part of the filtered observed activity sequence to an activity predictor;

receiving from the activity predictor an activity prediction based on the first part of the filtered observed activity sequence and corresponding in time to the second part of the filtered observed activity sequence, the activity prediction comprising a predicted behavior in the second part of the filtered observed activity sequence;

comparing the second part of the filtered observed activity sequence with the activity prediction to determine an extent to which the second part of the filtered observed activity sequence matches the activity prediction;

based on the extent to which the second part of the filtered observed activity sequence matches the activity prediction, classifying the filtered observed activity sequence as anomalous; and responsive to the classification of the filtered observed activity sequence as anomalous, performing a cybersecurity action in relation to the user account, the cybersecurity action comprising generating at a user interface an alert identifying the user account, locking or isolating the user account, or removing or suspending a privilege associated with the user account.

11. The computer-readable storage media of claim 10, wherein comparing the second part of the filtered observed activity sequence with the activity prediction further comprises computing an anomaly score based on:

a difference between the filtered observed activity sequence and the activity prediction, and a normalization factor computed based on the first part of the observed activity sequence.

12. The computer-readable storage media of claim 11, wherein the normalization factor is based on a variance of the first part of the observed activity sequence.

13. A computer-implemented method, comprising:

receiving an observed activity sequence associated with a user account, the observed activity sequence comprising a time series of activities associated with the user account in an observation period, and the observed activity sequence having a first part and a second part being later in time than the first part;

comparing the observed activity sequence with a benign behavior distribution;

based on the comparison, filtering out a benign activity from the observed activity sequence to generate a filtered observed activity sequence;

inputting the first part of the filtered observed activity sequence to an activity predictor;

receiving from the activity predictor an activity prediction based on the first part of the filtered observed activity sequence and corresponding in time to the second part of the filtered observed activity sequence, the activity prediction comprising a predicted behavior in the second part of the filtered observed activity sequence;

comparing the second part of the filtered observed activity sequence with the activity prediction to determine an extent to which the second part of the filtered observed activity sequence matches the activity prediction;

based on the extent to which the second part of the filtered observed activity sequence matches the activity prediction, classifying the filtered observed activity sequence as anomalous; and responsive to the classification of the filtered observed activity sequence as anomalous, performing a cybersecurity action in relation to the user account, the cybersecurity action comprising generating at a user interface an alert identifying the user account, locking or isolating the user account, or removing or suspending a privilege associated with the user account.

14. The method of claim 13, wherein the benign behavior distribution is selected based on a user group with which the user account is associated.

15. The method of claim 13 further comprising, after receiving the observed activity sequence associated with the user account:

identifying a first portion of the observed activity sequence in a first activity category;

training a first benign activity distribution based on the first portion associated with the first activity category;

identifying a second portion of the observed activity sequence in a second activity category;

training a second benign activity distribution based on the second portion associated with the second activity category; and wherein the observed activity sequence is selected based on comparing an element of the observed activity sequence with the first benign activity distribution and the second benign activity distribution.

16. The method of claim 13, wherein the benign behavior distribution is a Poisson distribution.

17. The method of claim 13, wherein comparing the observed activity sequence with the benign behavior distribution further comprises comparing an element of the observed activity sequence with one or more benign behavior distributions of a mixture model.

18. The method of claim 13, wherein an element of the observed activity sequence is used to determine the benign behavior distribution.

19. The method of claim 13, wherein the activity predictor is a sequence-based neural network that consumes and processes a sequential input with an attention-based architecture.

20. The method of claim 13, wherein comparing the second part of the filtered observed activity sequence with the activity prediction further comprises computing an anomaly score based on:

a difference between the filtered observed activity sequence and the activity prediction, and a normalization factor computed based on the first part of the observed activity sequence or a variance of the first part of the observed activity sequence.

* * * * *